(12) United States Patent
Lehr et al.

(10) Patent No.: US 8,005,798 B2
(45) Date of Patent: Aug. 23, 2011

(54) METHOD AND APPARATUS FOR PARTIAL DATA SET RECOVERY

(75) Inventors: Douglas Lee Lehr, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 12/433,776

(22) Filed: Apr. 30, 2009

(65) Prior Publication Data

US 2010/0281000 A1    Nov. 4, 2010

(51) Int. Cl.
*G06F 17/30* (2006.01)
(52) U.S. Cl. ........................................ 707/674
(58) Field of Classification Search .............. 707/2, 674; 714/5
See application file for complete search history.

(56) References Cited

U.S. PATENT DOCUMENTS

| 6,038,679 | A | * | 3/2000 | Hanson .......................... 714/5.1 |
| 6,640,326 | B1 | | 10/2003 | Buckingham et al. |
| 6,693,755 | B2 | | 2/2004 | Maple et al. |
| 6,728,907 | B1 | | 4/2004 | Wang et al. |
| 6,834,367 | B2 | | 12/2004 | Bonneau et al. |

* cited by examiner

*Primary Examiner* — Etienne P LeRoux
(74) *Attorney, Agent, or Firm* — Dale F. Regelman; Quarles & Brady LLP

(57) ABSTRACT

A method for data recovery of a data set migrated from a first storage media to a second storage media, where the data set includes a header record and multiple control records interleaved with corresponding data blocks. The header record is examined to identify a number of control records and data blocks comprising the data set. Next, the control records and data blocks are examined in order, starting with an initial data block, until a first data block is identified due to its failure to match the attribute included in the associated control record. Then the control records and data blocks are examined in reverse order, starting with a last data block, until a second data block is identified due to its failure to match an attribute included in the associated control record. Lastly, each data block from the first data block to the second data block are set to a lost data value.

20 Claims, 5 Drawing Sheets

METHOD AND APPARATUS FOR PARTIAL DATA SET RECOVERY

FIELD OF INVENTION

The invention is directed to a method and apparatus for partial data set recovery.

BACKGROUND OF THE INVENTION

Data storage systems migrate data between high-cost and low-cost storage media, such as from high speed storage devices, such as an electronic data storage device, to slower devices, such as optical discs, magnetic disks, magnetic tape drives, and the like. These slower devices are often organized into redundant arrays of independent disks ("RAID") configurations to provide fault tolerance and improved data access performance.

After data migration, a data verification process is often used to determine whether the data migrated was accurately translated and is complete. There are times when a target data storage medium fails, and/or the data is overwritten, and/or the data is corrupted, thereby resulting in loss of some or all of the migrated data. Where only some of the data is lost the end result is often still a complete loss of data, because no way exists to rebuild a complete data set from portions of the migrated data.

SUMMARY OF THE INVENTION

There exists a need for a method to recover all or partial data when a data storage medium fails during data migration, and a portion of the data is lost. In one implementation, a method for data recovery of a data set migrated from a first storage media to a second storage media is presented. The data set comprises a header record and multiple control records interleaved with corresponding data blocks. First, the header record is examined to identify a number of control records and data blocks recited therein. Next, the control records and data blocks are examined in order from a first data set end until a first corrupted data block is identified due to failure to match an attribute recited in an associated control record. Then, the control records and data blocks are examined in reverse order from a second data set end until a second corrupted data block is identified due to failure to match the attribute included in an associated control record. Lastly, each data block, starting with the first corrupted data block and ending with the second corrupted data block, are set to a lost data value.

In another implementation, a method for data recovery is presented. A data set is revised, where revising includes separating the data set into a plurality of data blocks and forming a corresponding plurality of control records, each control record describing attributes of a different data block. The control records are then interleaved with the associated data blocks. Finally, a header record is disposed in the data set to define the data set. The revised data set is then loaded onto a second storage media and verified to ensure that the loading went correctly.

By "verified," Applicants mean examining a header record to identify control records and associated data blocks comprising the data set and reviewing in order from a first data set end each control record and data block. If a data block does not match the attribute included in the associated control record then that data block is identified as a first corrupted data block. Data blocks and control records are each reviewed in reverse order from a second end of the data set. A second corrupted data block is then identified due to failure to match an attribute included in an associated control record. Finally, each data block, from and including the first corrupted data block through and including the second corrupted data block, are set to a lost data value.

In yet another implementation, an article of manufacture is provided comprising a computer readable medium comprising computer readable program code disposed therein for data recovery. The data set comprises a header record and multiple control records interleaved with data blocks. The computer readable program code includes a series of computer readable program steps to effect examining the header record of the data set to identify a number of control records and associated data blocks comprising the data set, reviewing in order from a first data set end each of the control records and data blocks, identifying a first corrupted data block which fails to match the attribute recited in an associated control record, reviewing in reverse order from a second data set end each control record and data block, and identifying a second corrupted data block which fails to match the attribute included in an associated control record. Finally, the computer readable program code comprises a series of computer readable program steps to effect setting to a lost data value each of the data blocks from and including the first corrupted data block through and including the second corrupted data block.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

This invention is described in preferred embodiments in the following description with reference to the figures in which like numbers represent the same or similar elements. Reference throughout this specification to "one embodiment," "an embodiment," or similar language means that a particular feature, structure, or characteristic described in connection with the embodiment is included in at least on embodiment of the present invention. Thus, appearances of the phrases "in one embodiment,' "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally; the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
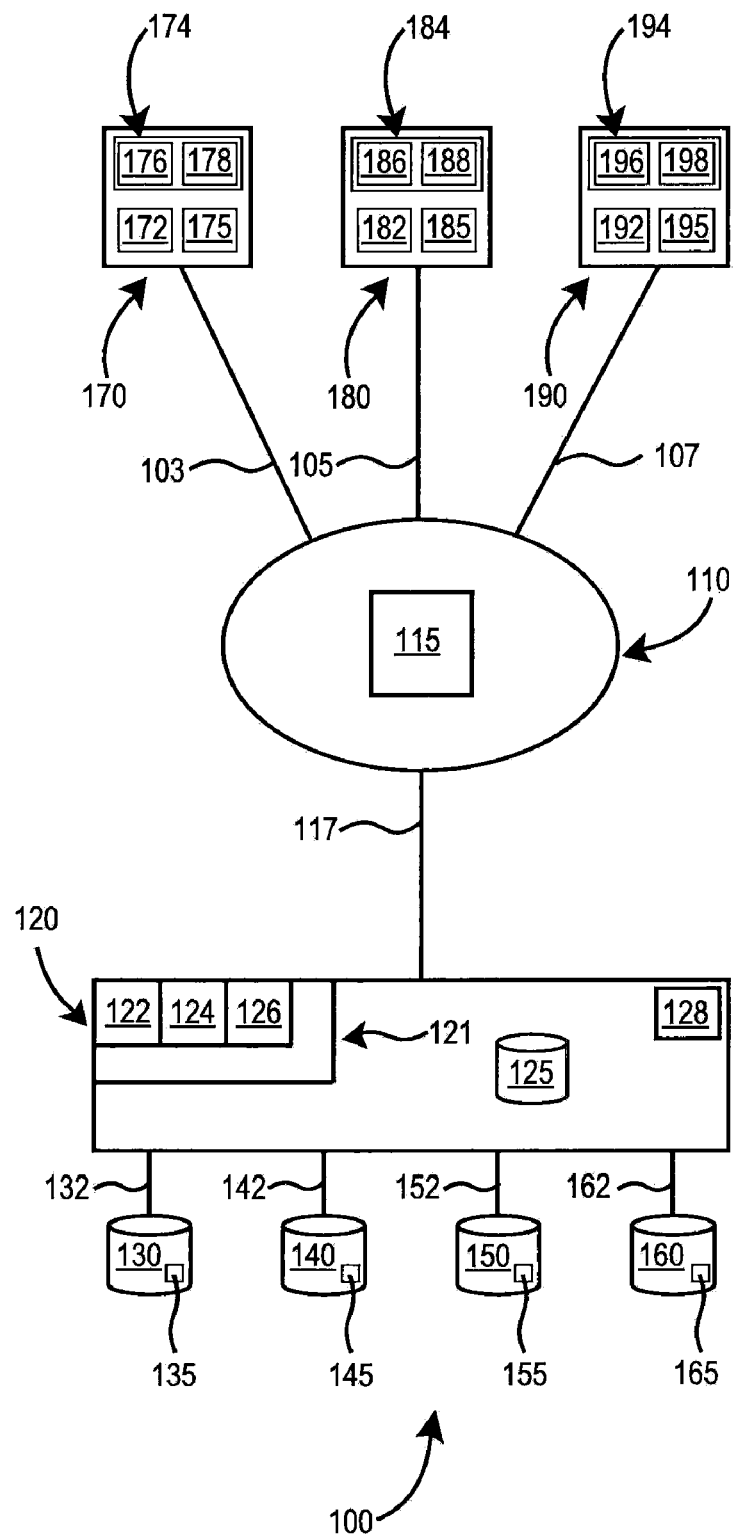
FIG. 1 is a block diagram showing one embodiment of a data storage system according to the present discussion.

In the illustrated embodiment of FIG. 1, computing system 100 comprises storage controller 120 and data storage devices 130, 140, 150, and 160. In the illustrated embodiment of FIG. 1, storage controller 120 communicates with data storage devices 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage device," the Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' storage controller 120 is in communication with host computers 170, 180, and 190. As a general matter, host computers 170, 180, and 190, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 170, 180, and/or 190, further includes a storage management module 172, 182, 192, respectively. In certain embodiments, storage management module 172, 182, 192, may include the functionality of storage management type programs known in the art that manage the transfer of data to and from a data storage and retrieval system, such as for example and without limitation the IBM DFSMS implemented in the IBM MVS operating system.

Storage management modules 172, 182, and 192 may be implemented as a hardware circuit comprising custom VLSI circuits or gate arrays, off-the-shelf semiconductors such as logic chips, transistors, or other discrete components. Storage management modules 172, 182, and 192 may also be implemented in programmable hardware devices such as field programmable gate arrays, programmable array logic, programmable logic devices, or the like.

Storage management modules 172, 182, and 192 may also be implemented in software for execution by various types of processors. An identified module of executable code may, for instance, comprise one or more physical or logical blocks of computer instructions which may, for instance, be organized as an object, procedure, or function. Nevertheless, the executables of an identified storage management module need not be physically collocated, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the illustrated embodiment of FIG. 1, storage controller 120 comprises processor 128, computer readable medium 121, microcode 122 written to computer readable medium 121, and instructions 124 written to computer readable medium 121. Processor 128 utilizes microcode 122 to operate storage controller 120.

In the illustrated embodiment of FIG. 1, host computers 170, 180, and 190, are connected to fabric 110 utilizing I/O protocols 103, 105, and 107, respectively. I/O protocols 103, 105, and 107, may be any type of I/O protocol; for example, a Fibre Channel ("FC") loop, a direct attachment to fabric 110 or one or more signal lines used by host computers 170, 180, and 190, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to Storage controller 120 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from storage controller 120, and subsequently data storage devices 130, 140, 150, and 160. In other embodiments, one or more host computers, such as for example and without limitation host computers 170, 180, and 190, communicate directly with storage controller 120 using I/O protocols 103, 105, and 107, respectively.

Storage management modules 172, 182, and 192, are utilized to migrate data between classes of data storage media, i.e. from higher cost media with shorter data access times to lower cost media with longer data access times. In the course of such a migration, a data storage medium may fail, or data may be overwritten or corrupted. Even where only a portion of the data set is lost, the end result may still be a complete loss of data unless the data set can be rebuilt. To prevent such situations, Applicants' storage management module can prepare the data set prior to migration such that partial data recovery is possible.

Figure 2:
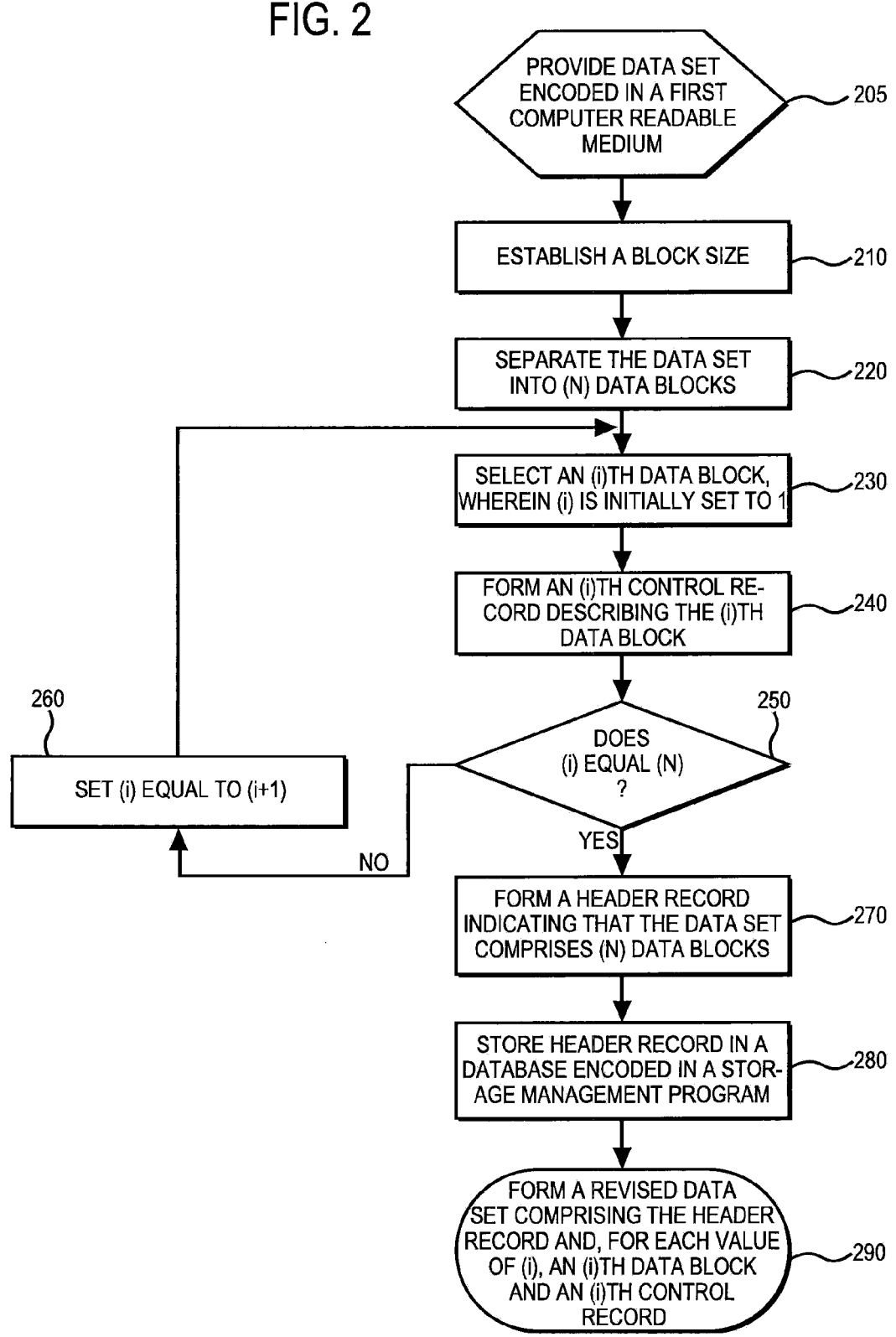
FIG. 2 is a flow chart summarizing Applicants' method to prepare a revised data set for migration and recovery according to the present discussion.

FIG. 2 illustrates one embodiment of Applicants' method to prepare a data set for migration and recovery according to the present invention. In step 205, the method provides a data set, such as for example data set 176 (FIG. 1), 186 (FIG. 1), and/or 196 (FIG. 1), encoded in a first computer readable medium, such as computer readable medium 174 (FIG. 1), 184 (FIG. 1), 194 (FIG. 1). In certain embodiments, the first computer readable medium of step 205 comprises a DASD, such as DASD 125 (FIG. 1). In certain embodiments, the first computer readable medium of step 205 comprises an electronic storage medium. By "electronic storage medium," Applicants mean, for example and without limitation, a PROM, EPROM, EEPROM, Flash PROM, compactflash, smartmedia, and the like.

In certain embodiments, the first computer readable medium of step 205 is disposed in a host computer, such as host computer 170, 180, and/or 190. In certain embodiments, the first computer readable medium of step 205 is disposed in a storage controller, such as storage controller 120 (FIG. 1).

In step 210, the method establishes a block size. In certain embodiments, the block size of step 210 comprises a number of bytes in sequence. In other embodiments, the block size of step 210 is defined by s starting block id and an ending block id. In yet other embodiments, the block size of step 210 comprises a number of data tracks.

In certain embodiments, step 210 is performed by an owner of the data set of step 205. In certain embodiments, step 210 is performed by a host computer, such as for example host computer 170, 180, and/or 190. In certain embodiments step 210 is performed by a storage management module, such as for example storage management module 172, 182, and/or 192. In certain embodiments, step 210 is performed by an owner and/or operator of a storage controller, such as storage controller 120.

In step 220, the method forms from the data set of step 205 a plurality of data blocks, wherein each data block substantially comprises the block size of step 210. By "substantially comprises," Applicants mean plus or minus about ten percent (10%).

In certain embodiments step 220 is performed by a host computer, such as host computer 170, 180, and/or 190. In certain embodiments step 220 is performed by a storage management module, such as for example storage management module 172, 182, and/or 192. In certain embodiments, step 220 is performed by a storage controller, such as storage controller 120.

In step 230, the method selects on (i)th data block, wherein (i) is initially set for 1. In certain embodiments step 230 is performed by a host computer, such as host computer 170, 180, and/or 190. In certain embodiments step 220 is performed by a storage management module, such as for example storage management module 172, 182, and/or 192. In certain embodiments, step 230 is performed by a storage controller, such as storage controller 120.

In step 240, the method forms an (i)th control record describing at least one attribute of the (i)th data block of step 230. In certain embodiments, the (i)th control record recites an (i)th data block size. In certain embodiments, the (i)th control record recites an (i)th data block location within the data set. In certain embodiments step 240 is performed by a host computer, such as host computer 170, 180, and/or 190. In certain embodiments step 240 is performed by a storage management module, such as for example storage management module 172, 182, and/or 192. In certain embodiments, step 240 is performed by a storage controller, such as storage controller 120.

In step 250, the method determines if a control record has been formed for each of the (N) data blocks of step 220, i.e. if (i) equals (N). In certain embodiments step 250 is performed by a host computer, such as host computer 170, 180, and/or 190. In certain embodiments step 250 is performed by a storage management module, such as for example storage management module 172, 182, and/or 192. In certain embodiments, step 250 is performed by a storage controller, such as storage controller 120.

If the method determines in step 250 that (i) does not equal (N), then the method transitions from step 250 to step 260 wherein the method sets (i) equal to (i+1). In certain embodiments step 260 is performed by a host computer, such as host computer 170, 180, and/or 190. In certain embodiments step 260 is performed by a storage management module, such as for example storage management module 172, 182, and/or 192. In certain embodiments, step 260 is performed by a storage controller, such as storage controller 120. The method transitions from step 260 to step 230 and continues as described herein.

Alternatively, if the method determines in step 250 that a control record has been formed for each of the (N) data blocks of step 220, i.e. (i) equals (N), then the method transitions from step 250 to step 270 wherein the method forms a header record indicating that the data set of step 205 has been divided into (N) blocks. In certain embodiments step 270 is performed by a host computer, such as host computer 170, 180, and/or 190. In certain embodiments step 270 is performed by a storage management module, such as for example storage management module 172, 182, and/or 192. In certain embodiments, step 270 is performed by a storage controller, such as storage controller 120.

In step 280, the method stores the header record of step 270. In certain embodiments, the header record of step 270 is encoded in computer readable medium 121 (FIG. 1). In certain embodiments, the header record of step 270 is encoded in DASD 170 (FIG. 1). In certain embodiments step 280 is performed by a host computer, such as host computer 170, 180, and/or 190. In certain embodiments step 280 is performed by a storage management module, such as for example storage management module 172, 182, and/or 192. In certain embodiments, step 280 is performed by a storage controller, such as storage controller 120.

In certain embodiments, the header record of step 270 is encoded in storage management module 172 (FIG. 1). In certain embodiments, the header record of step 270 is encoded in computer readable medium 174 (FIG. 1). In certain embodiments, the header record of step 270 is encoded in storage management module 182 (FIG. 1). In certain embodiments, the header record of step 270 is encoded in computer readable medium 184 (FIG. 1). In certain embodiments, the header record of step 270 is encoded in storage management module 192 (FIG. 1). In certain embodiments, the header record of step 270 is encoded in computer readable medium 194 (FIG. 1).

In step 290, the method forms a revised data set comprising the header record of step 270 in combination with, for each value of (i), an (i)th data block and an (i)th control record, wherein the (i)th control record recites at least one unique attribute of the (i)th data block. In certain embodiments step 290 is performed by a host computer, such as host computer 170, 180, and/or 190. In certain embodiments step 290 is performed by a storage management module, such as for example storage management module 172, 182, and/or 192. In certain embodiments, step 290 is performed by a storage controller, such as storage controller 120.

Figure 3:
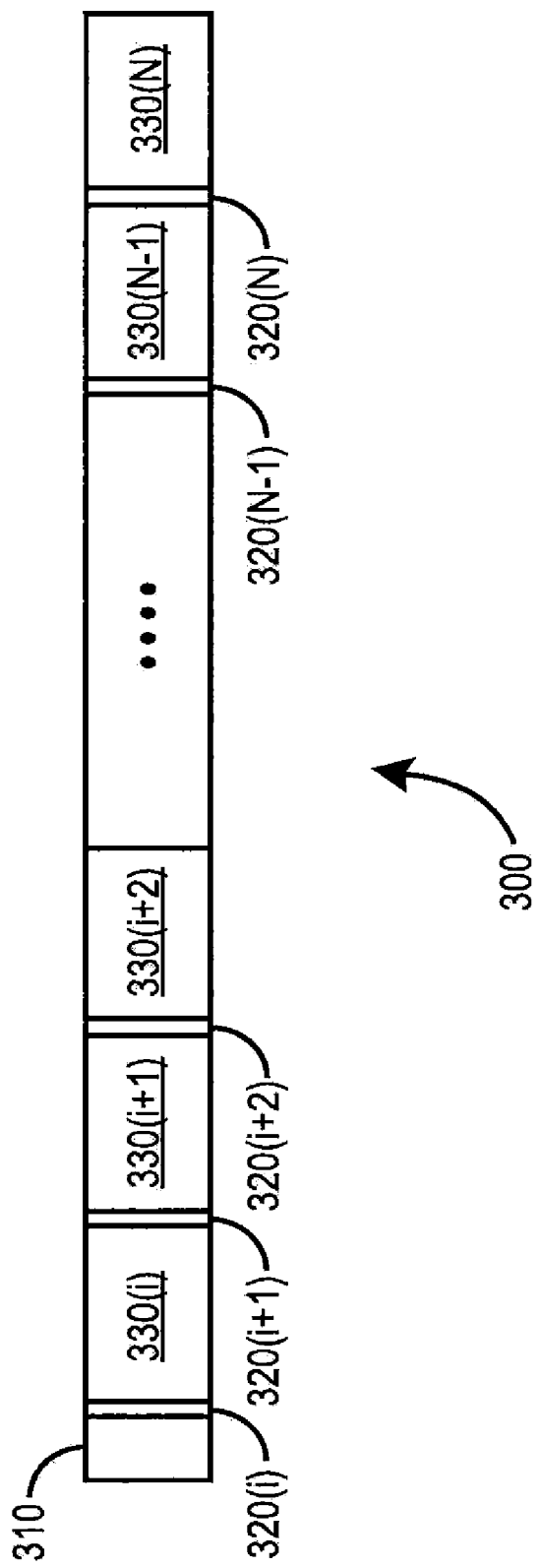
FIG. 3 is a block diagram showing one embodiment of Applicants' revised data set according to the present discussion.

FIG. 3 illustrates one embodiment of a revised data set of step 290 (FIG. 2). Referring now to FIG. 3, revised data set 300 comprises a header record 310, (N) data blocks 330 interleaved with (N) control records 320. In certain embodiments, each data block 330(i) through 330 (N) comprises substantially the same size. In other embodiments, each data block 330(i) through 330 (N) comprises a different size.

After a modified data set 300 has been migrated from a first computer readable medium to a second computer readable medium, a data verification process determines if the revised data set as encoded in the second computer readable medium is complete. If the data verification process indicates that the revised data set, as encoded in the second computer readable medium, is not complete, then the a data recovery procedure is initiated. In other embodiments, a data recovery procedure is initiated when a host computer application encounters a problem reading the revised data set, such as for example, the next time the data comprising the revised data set is accessed. In either embodiment, FIG. 4 summarizes Applicants' data recovery procedure.

Figure 4:
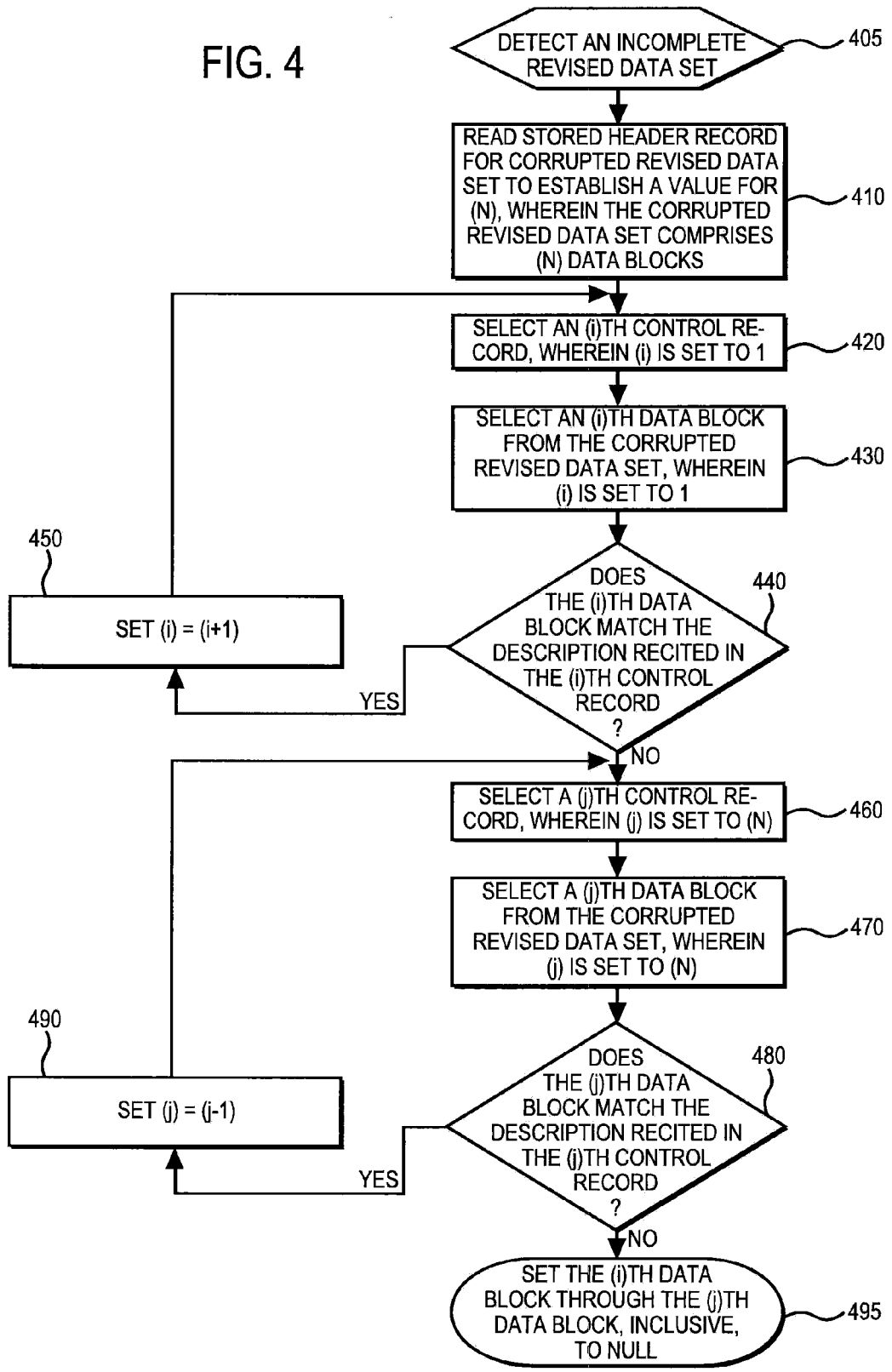
FIG. 4 is a flowchart summarizing Applicants' method to recover data from a corrupted a data set according to the present discussion.

Referring now to FIG. 4, in step 405 the method detects an incomplete revised data set. In certain embodiments step 405 is performed by a host computer, such as host computer 170, 180, and/or 190. In certain embodiments step 405 is performed by a storage management module, such as for example storage management module 172, 182, and/or 192. In certain embodiments, step 405 is performed by a storage controller, such as storage controller 120.

In step 410, the method reads a header record associated with the corrupted data set to determine a value for (N), wherein the corrupted revised data set comprises (N) data blocks. In certain embodiments, step 405 comprises reading a header record encoded in the corrupted data set. In certain embodiments, step 405 comprises reading a stored header record.

In certain embodiments, the header record recites a value for (N). In certain embodiments, the header record recites a size of the data set and from this size the number of data blocks can be determined where each data block comprises the same block size. In certain embodiments, the header record may recite a number of control records (N).

In certain embodiments step 410 is performed by a host computer, such as host computer 170, 180, and/or 190. In certain embodiments step 410 is performed by a storage management module, such as for example storage management module 172, 182, and/or 192. In certain embodiments, step 410 is performed by a storage controller, such as storage controller 120.

In step 420, the method sets (i) to 1, and selects an (i)th control record from the corrupted data set. In certain embodiments step 420 is performed by a host computer, such as host computer 170, 180, and/or 190. In certain embodiments step 420 is performed by a storage management module, such as for example storage management module 172, 182, and/or 192. In certain embodiments, step 420 is performed by a storage controller, such as storage controller 120.

In step 430, the method selects an (i)th data block from the corrupted data set. In certain embodiments step 430 is performed by a host computer, such as host computer 170, 180, and/or 190. In certain embodiments step 430 is performed by a storage management module, such as for example storage management module 172, 182, and/or 192. In certain embodiments, step 430 is performed by a storage controller, such as storage controller 120.

In step, 440 the method determines if the (i)th data block matches the attribute recited in the (i)th control record. In certain embodiments step 440 is performed by a host computer, such as host computer 170, 180, and/or 190. In certain embodiments step 440 is performed by a storage management module, such as for example storage management module 172, 182, and/or 192. In certain embodiments, step 440 is performed by a storage controller, such as storage controller 120.

If the method determines in step 440 that the (i)th data block matches the attribute recited in the (i)th control record, then the method transitions from step 440 to step 450 wherein the method increments (i) by unity, i.e. sets (i) equal to (i+1). The method transitions from step 450 to step 420 and continues as described herein.

In certain embodiments step 450 is performed by a host computer, such as host computer 170, 180, and/or 190. In certain embodiments step 450 is performed by a storage management module, such as for example storage management module 172, 182, and/or 192. In certain embodiments, step 450 is performed by a storage controller, such as storage controller 120.

Alternatively, if the method determines in step 440 that the (i)th data block does not match the attribute recited in the (i)th control record, then the method transitions from step 440 to step 460 wherein the method sets (j) to (N), and selects a (j)th control record from the corrupted data set. In certain embodiments step 460 is performed by a host computer, such as host computer 170, 180, and/or 190. In certain embodiments step 460 is performed by a storage management module, such as for example storage management module 172, 182, and/or 192. In certain embodiments, step 460 is performed by a storage controller, such as storage controller 120.

In step 470, the method selects a (j)th data block from the corrupted data set. In certain embodiments step 470 is performed by a host computer, such as host computer 170, 180, and/or 190. In certain embodiments step 470 is performed by a storage management module, such as for example storage management module 172, 182, and/or 192. In certain embodiments, step 470 is performed by a storage controller, such as storage controller 120.

In step, 480 the method determines if the (j)th data block matches the attribute recited in the (j)th control record. In certain embodiments step 480 is performed by a host computer, such as host computer 170, 180, and/or 190. In certain embodiments step 480 is performed by a storage management module, such as for example storage management module 172, 182, and/or 192. In certain embodiments, step 480 is performed by a storage controller, such as storage controller 120.

If the method determines in step 480 that the (j)th data block matches the attribute recited in the (j)th control record, then the method transitions from step 480 to step 490 wherein the method decrements (j) by unity, i.e. sets (j) equal to (j−1). The method transitions from step 490 to step 460 and continues as described herein.

Alternatively, if the method determines in step 480 that the (j)th data block does not match the attribute recited in the (j)th control record, then the method transitions from step 480 to step 495 wherein the method sets the (i)th data block in the corrupted data set through the (j)th data block in the corrupted data set to a null value. In other embodiments, the value of the (i)th through the (j)th data blocks may be set to any value which indicates those data blocks are invalid but which allows the other data blocks to be read. In certain embodiments step 490 is performed by a host computer, such as host computer 170, 180, and/or 190. In certain embodiments step 490 is performed by a storage management module, such as for example storage management module 172, 182, and/or 192. In certain embodiments, step 490 is performed by a storage controller, such as storage controller 120.

Figure 5:
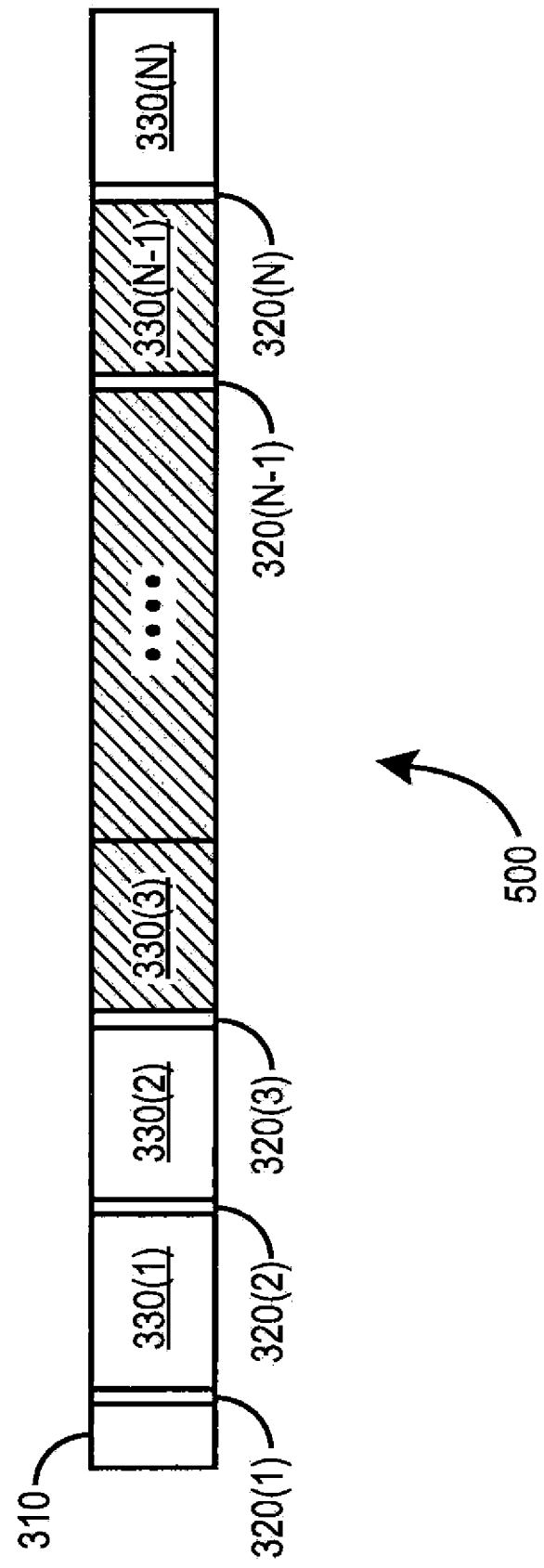
FIG. 5 is a block diagram illustrating a recovered data set formed using Applicants' method.

By utilizing the data recovery method of FIG. 5, Applicants' method recovers valid data from a corrupted data set while ignoring invalid data from that corrupted data set.

For example and referring now to FIG. 5, if Applicants' method determines that a corrupted data set 500 comprises (N) data blocks, and further determines that data blocks 330(1) and 330(2) each match the attribute recited in control records 320(1) and 320(2), respectively, but that data block 330(3) does not match the attribute recited in control record 320(3), and the method then determines that data block (N) matches the attribute recited in control record 330(N), but that data block 330(N−1) does not match the attribute recited in control record (320(N−1), then the method sets all data blocks from data block 330(3) through data block 330(N−1), inclusive, to a null value.

In certain embodiments, individual steps recited in FIGS. 2 and 4 may be combined, eliminated, or reordered.

In certain embodiments, Applicants' invention includes instructions, such as instructions 178 (FIG. 1), 188 (FIG. 1), 198 (FIG. 1), 126 (FIG. 1), residing in computer readable medium 174 (FIG. 1), 184 (FIG. 1), 194 (FIG. 1), 121 (FIG. 1), respectively, wherein those instructions are executed by a processor, such as processor 175 (FIG. 1), 185 (FIG. 1), 195 (FIG. 1), 128 (FIG. 1), respectively, to perform one or more of steps 205, 210, 220, 230, 240, 250, 260, 270, 280, and/or 290, recited in FIG. 2, and/or one or more of steps 405, 410, 420, 430, 440, 450, 460, 470, 480, 490, and/or 495, recited in FIG. 4.

In other embodiments, Applicants' invention includes instructions residing in any other computer program product, where those instructions are executed by a computer external to, or internal to, storage system 100 (FIG. 1), to perform one or more of steps 205, 210, 220, 230, 240, 250, 260, 270, 280, and/or 290, recited in FIG. 2, and/or one or more of steps 405, 410, 420, 430, 440, 450, 460, 470, 480, 490, and/or 495, recited in FIG. 4. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for data recovery of a data set migrated from a first data storage media to a second data storage media, the data set comprising a header record, a plurality of control records interleaved with a corresponding plurality of data blocks, comprising:
    examining a header record associated with the data set to determine a number of control records and data blocks disposed in said data set;
    reviewing seriatim each of said control records and each of said data blocks;
    identifying a first data block, wherein the first data block fails to match an attribute provided in an associated control record;
    reviewing in reverse seriatim each of said control records and each of said data blocks;
    identifying a second data block, wherein the second data block fails to match an attribute provided in an associated control record; and
    setting each of said data blocks from the first data block through the second data block to a lost data value.

2. The method of claim 1, wherein said plurality of control records comprise (N) control records, wherein said plurality of data blocks comprise (N) data blocks, wherein (N) is greater than or equal to 1, said reviewing seriatim step comprising:
    selecting an (i)th data block;
    selecting an (i)th control record, wherein the (i)th control record recites at least one attribute of the (i)th data block, and wherein (i) is initially set to 1, and wherein (i) is less than or equal to (N);
    establishing if the (i)th data block matches each attribute recited in the (i)th control record;
    operative if the (i)th data block matches each attribute recites in the (i)th control record, setting (i) equal to (i+1) and repeating said selecting steps and said establishing step.

3. The method of claim 2, wherein said establishing step further comprises determining if a size of the (i)th data block is equal to a block size recited in the (i)th control record.

4. The method of claim 2, wherein said reviewing reverse seriatim step comprises:
    choosing a (j)th control record, wherein (j) is initially set to (N) and wherein (j) is less than or equal to (i);
    choosing a (j)th data block, wherein said (j)th control record recites an attribute of said (j)th data block;
    determining if the (j)th data block matches each attribute provided in the (j)th control record;
    operative if the (j)th data block matches each attribute provided in the (j)th control record, setting (j) equal to (j−1) and repeating said choosing steps and said determining step.

5. The method of claim 4, wherein determining further comprises determining if a size of the (j)th data block is equal to a block size recited in the (j)th control record.

6. A method for data recovery, comprising:
    retrieving a data set from a first computer readable medium;
    separating the data set into a plurality of data blocks;
    for each of said data blocks, forming a control record describing an attribute of said data block;
    forming a header record, wherein the header record recites a number of data blocks comprising the data set;
    forming a revised data set comprising said header record, said plurality of data blocks interleaved with said plurality of control records;
    writing said revised data set to a second computer readable medium.

7. The method of claim 6, further comprising:
    examining the header record to identify a number of data blocks comprising said revised data set;
    examining seriatim each of said control records and each of said data blocks;
    operative if a data block fails to match an attribute provided in an associated control record, designating that data block as a first corrupted data block;

evaluating in reverse seriatim each of said control records and each of said data blocks;

operative if a data block fails to match an attribute provided in an associated control record, designating that data block as a second corrupted data block;

setting said first corrupted data block, said second corrupted data block, and each data block disposed between said first corrupted data block and said second corrupted data block to comprise a lost data value.

8. The method of claim 7, wherein each said control record includes a block size.

9. The method of claim 8, wherein said examining step comprises determining if a size of each of said data blocks is equal to a block size recited in an associated control record.

10. The method of claim 9, wherein said evaluating steps comprises determining if a size of each of said data block is equal to a block size recited in an associated control record.

11. An article of manufacture comprising a computer readable medium comprising computer readable program code disposed therein for data set recovery, the data set comprising a header record, a plurality of control records interleaved with a corresponding plurality of data blocks, wherein each control record is associated with a different data block, the computer readable program code comprising a series of computer readable program steps to effect:

examining a header record associated with the data set to determine a number of control records and data blocks disposed in said data set;

reviewing seriatim each of said control records and each of said data blocks;

identifying a first data block, wherein the first data block fails to match an attribute provided in said corresponding control record;

reviewing in reverse seriatim each of said control records and each of said data blocks;

identifying a second data block, wherein the second data block fails to match an attribute provided in said corresponding control record; and setting each of said data blocks from the first data block through the second data block to a lost data value.

12. The article of manufacture of claim 11, wherein said plurality of control records comprise (N) control records, wherein said plurality of data blocks comprise (N) data blocks, wherein (N) is greater than or equal to 1, wherein said computer readable program code to review seriatim each of said control records and each of said data blocks further comprises a series of computer readable program steps to effect:

selecting an (i)th data block;

selecting an (i)th control record, wherein said (i)th control record recites an attribute of said (i)th data block, and wherein (i) is initially set to 1, and wherein (i) is less than or equal to (N);

establishing if the (i)th data block matches each attribute provided in the (i)th control record;

operative if the (i)th data block matches each attribute provided in the (i)th control record, setting (i) equal to (i+1) and repeating said selecting steps and said establishing step.

13. The article of manufacture of claim 12, wherein said computer readable program code to establish if the (i)th data block matches each attribute provided in the (i)th control record further comprises a series of computer readable program steps to effect determining if a size of the (i)th data block is equal to a block size recited in the (i)th control record.

14. The article of manufacture of claim 12, wherein said computer readable program code to review in reverse seriatim each of said control records and each of said data blocks further comprises a series of computer readable program steps to effect:

choosing a (j)th control record, wherein (j) is initially set to (N) and wherein (j) is less than or equal to (i);

choosing a (j)th data block, wherein said (j)th control record recites an attribute of said (j)th data block;

determining if the (j)th data block matches each attribute provided in the (j)th control record;

operative if the (j)th data block matches each attribute provided in the (j)th control record, setting (j) equal to (j−1) and repeating said choosing steps and said determining step.

15. The article of manufacture of claim 12, wherein said computer readable program code to determine if the (j)th data block fails to match an attribute provided in the (j)th control record further comprises a series of computer readable program steps to effect determining if a size of the (j)th data block is equal to a block size recited in the (j)th control record.

16. An article of manufacture comprising a computer readable medium comprising computer readable program code disposed therein for data recovery, the computer readable program code comprising a series of computer readable program steps to effect:

retrieving a data set from a first computer readable medium;

separating the data set into a plurality of data blocks;

for each of said data blocks, forming a control record describing an attribute of said data block;

forming a header record, wherein the header record recites a number of data blocks comprising the data set;

forming a revised data set comprising said header record, said plurality of data blocks interleaved with said plurality of control records;

writing said revised data set to a second computer readable medium.

17. The article of manufacture of claim 16, the computer readable program code further comprising a series of computer readable program steps to effect:

examining the header record to identify a number of data blocks comprising said revised data set;

examining seriatim each of said control records and each of said data blocks;

operative if a data block fails to match an attribute provided in an associated control record, designating that data block as a first corrupted data block;

evaluating in reverse seriatim each of said control records and each of said data blocks;

operative if a data block fails to match an attribute provided in an associated control record, designating that data block as a second corrupted data block;

setting said first corrupted data block, said second corrupted data block, and each data block disposed between said first corrupted data block and said second corrupted data block to comprise a lost data value.

18. The article of manufacture of claim 16, wherein each said control record includes a block size.

19. The article of manufacture of claim 18, wherein said computer readable program code to examine seriatim each of said control records and each of said data blocks, further comprises a series of computer readable program steps to effect determining if a size of each of said data blocks is equal to a block size recited in an associated control record.

20. The article of manufacture of claim 18, wherein said computer readable program code to evaluating in reverse seriatim each of said control records and each of said data blocks, further comprises a series of computer readable program steps to effect determining if a size of each of said data blocks is equal to a block size recited in an associated control record.

* * * * *